US008600628B2

(12) United States Patent
Haemmerl et al.

(10) Patent No.: US 8,600,628 B2

(45) Date of Patent: Dec. 3, 2013

(54) INDUSTRIAL TRUCK WITH OPTICAL LIFTING HEIGHT MEASUREMENT

(75) Inventors: Robert Haemmerl, Hohenthann (DE); Carsten Schoettke, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 422 days.

(21) Appl. No.: 12/487,938

(22) Filed: Jun. 19, 2009

(65) Prior Publication Data

US 2009/0319134 A1 Dec. 24, 2009

(30) Foreign Application Priority Data

Jun. 19, 2008 (DE) ......................... 10 2008 029 205

(51) Int. Cl.
*G06F 7/70* (2006.01)

(52) U.S. Cl.
USPC ............................................................ 701/50

(58) Field of Classification Search
USPC ............................................ 701/50; 187/236
See application file for complete search history.

(56) References Cited

U.S. PATENT DOCUMENTS

| | | | | |
|---|---|---|---|---|
| 3,031,091 | A * | 4/1962 | Erickson et al. | 414/544 |
| 3,782,503 | A * | 1/1974 | Sinclair | 187/226 |
| 4,499,541 | A | 2/1985 | Yuki et al. | |
| 5,103,226 | A | 4/1992 | Dammeyer et al. | |
| 5,783,755 | A * | 7/1998 | Bruns | 73/862.541 |
| 6,269,913 | B1 * | 8/2001 | Kollmannsberger et al. | 187/394 |
| 6,829,835 | B2 * | 12/2004 | Pfeil | 33/333 |
| 7,194,358 | B2 * | 3/2007 | Callaghan et al. | 701/301 |
| 7,266,904 | B2 * | 9/2007 | Hammerl et al. | 33/706 |
| 7,287,625 | B1 * | 10/2007 | Harris | 187/282 |
| 2006/0005415 | A1 | 1/2006 | Hammerl et al. | |
| 2009/0101447 | A1 | 4/2009 | Durham et al. | |

FOREIGN PATENT DOCUMENTS

| | | | |
|---|---|---|---|
| DE | 2609029 | A1 | 9/1977 |
| DE | 100 54 789 | A1 | 5/2002 |
| DE | 102 07 017 | A1 | 8/2003 |

(Continued)

OTHER PUBLICATIONS

European Search Report for EP 09 16 3260 dated Oct. 23, 2009, 6 pages.

*Primary Examiner* — Thomas B Will
*Assistant Examiner* — Joel F. Mitchell
(74) *Attorney, Agent, or Firm* — Rothwell, Figg, Ernst & Manbeck, P.C.

(57) ABSTRACT

The invention relates to an industrial truck, comprising a vehicle frame, a lifting framework (14), the lifting framework (14) having a first lifting frame (20) which is attached to the vehicle frame, and at least one lifting arrangement (22, 24) which is movable in the vertical direction (V) relative to the first lifting frame (20), and a measuring arrangement (32, 38, 40) which is provided in order to detect a movement of the first lifting frame (20) and/or of the lifting arrangement (22, 24) relative to the vehicle frame. In this case, it is provided according to the invention that the measuring arrangement comprises at least one optical sensor (32) by means of which the movement of the first lifting frame (20) and/or of the lifting arrangement (22, 24) can be sensed contactlessly. Furthermore, the invention proposes a method for determining the lifting height in a lifting framework of an industrial truck, with the distance covered by the first lifting frame (20) and/or by the lifting arrangement (22, 24) being detected by sensing of a surface (36) of the first lifting frame (20) or of the lifting arrangement (22, 24) by means of an associated optical sensor (32).

20 Claims, 8 Drawing Sheets

(56) References Cited

FOREIGN PATENT DOCUMENTS

| | | | |
|---|---|---|---|
| DE | 32 11 486 | A1 | 6/2009 |
| EP | 1614651 | A2 | 1/2006 |
| GB | 2 387 443 | A | 10/2003 |
| JP | 11292498 | A | 10/1999 |
| JP | 2000026097 | A | 1/2000 |

* cited by examiner

INDUSTRIAL TRUCK WITH OPTICAL LIFTING HEIGHT MEASUREMENT

The present invention relates to an industrial truck, comprising a vehicle frame, a lifting framework, the lifting framework having a first lifting frame which is attached to the vehicle frame, and at least one lifting arrangement which is movable in the vertical direction relative to the first lifting frame, and a measuring arrangement which is provided in order to detect a movement of the first lifting frame and/or of the lifting arrangement relative to the vehicle frame, the measuring arrangement comprising at least one optical sensor.

An industrial truck of this type is known from DE 10 2004 033 170 A1. In the measuring arrangement used there, the optical sensor is attached to a sliding block which rests on the lifting frame. The optical sensor senses a sensor scale which is formed on the lifting frame and comprises depressions arranged closely next to one another. Said sensor scale forms a position indicator which is required for detecting movement.

For measurement of the distance or height on lifting frameworks of industrial trucks, it is furthermore known to use cable-pull measuring systems or magnetic strip systems. Furthermore, it is also known to measure the rotation of a running wheel running along the movable part of the lifting framework. In such measuring arrangements for industrial trucks, a high degree of accuracy and precise reproducibility of the measuring results are required in order to be able to satisfy the safety requirements during everyday use.

In particular in the case of mechanical measuring arrangements, such as, for example, supporting of the sensor in the sliding block, cable-pull measuring systems or measuring systems in which the rotation of a rolling running wheel is measured, wear may occur on the mechanical parts assigned to the measuring arrangement, which may lead to inaccuracies in the lifting height measurement. If appropriate, exchange of said mechanically stressed components is then required. Furthermore, measuring inaccuracies may occur in sensor scales if the sensor scale is soiled and therefore only part thereof is recognized by the sensor.

It is therefore the object of the invention to develop an industrial truck of the type in question in such a manner that movements of the first lifting frame and/or of the lifting arrangement relative to the vehicle frame can be measured with little or no wear.

For this purpose, it is proposed according to the invention that the movement of the first lifting frame and/or of the lifting arrangement can be sensed contactlessly by the measuring arrangement, with the coincidental surface design of the lifting frame and/or of the lifting arrangement being sensed by the optical sensor.

Such a measuring arrangement is free from mechanically stressed components which are susceptible to wear. This results in a low-maintenance measuring system which is cost-effective to maintain. The sensor is oriented with the coincidental surface design of the lifting frame or of the lifting arrangement during the detection of the movement, and therefore regular markings are not required in order to detect the movement. The coincidental surface design serves as basic information and is directly sensed by the sensor. In this case, there may also be coincidental scratches or impurities on the surface without the detection of the movement being impaired as a result. The sensor therefore operates comparably to an optical computer mouse.

According to a preferred development, the optical sensor is fastened to the first lifting frame and faces a surface of the vertically movable lifting arrangement such that the movement of the lifting arrangement relative to the first lifting frame can be detected. In this case, the optical sensor is preferably at a distance from the surface which is to be sensed, said distance permitting optimum measurement of the movement. Current optical sensors which are suitable for such a measuring arrangement are at a distance of approximately 20-60 mm, preferably approximately 40 mm, from the sensed surface.

In the case of an industrial truck with such a measuring arrangement, the lifting arrangement can have at least one second lifting frame which can be displaced telescopically in the vertical direction with respect to the first lifting frame, with the second lifting frame being guided on the first lifting frame.

In this connection, it is proposed that the optical sensor is directed toward a surface of the at least one second lifting frame such that the movement of the second lifting frame relative to the first lifting frame can be detected. In such an arrangement, the first lifting frame is held immovably in the vertical direction with respect to the vehicle frame and forms a positionally fixed component to which the optical sensor is attached. The at least one second lifting frame moves in the vertical direction relative to the first lifting frame, and its movement can be sensed by the optical sensor which is attached in a positionally fixed manner.

As a development, but also as an independent aspect, it is proposed that, if the industrial truck has a plurality of second lifting frames which are guided telescopically on one another in the vertical direction, an in particular stepped-up or stepped-down vertical movement coupling between the second lifting frames is provided. For example, it is possible that the second lifting frame which is adjacent to the first lifting frame moves at a ratio of 1:1 to a further, second lifting frame (third lifting frame) which is guided in said second lifting frame, and therefore the one second lifting frame moves by, for example, 10 cm relative to the first lifting frame, which leads to a movement of the third lifting frame relative to the second lifting frame of likewise 10 cm such that, overall, a lifting height of 20 cm is achieved.

By means of such a stepped-up coupling of movement, the lifting height can be detected solely by the optical sensor attached to the first lifting frame, with it being possible for the lifting height reached to be totted up by a control system, which is assigned to the industrial truck, on the basis of the known transmission ratio of the movements of the two second lifting frames. Of course, other transmission ratios, such as, for example, 1:2, are also conceivable. Should such a coupling of movement between the second lifting frames not be provided, it is alternatively also conceivable, however, for optical sensors to be arranged on the second lifting frames, said sensors sensing the movement of an adjacent, second lifting frame (third lifting frame).

An optical sensor is preferably used, which sensor is designed in such a manner that two movement components which are orthogonal with respect to each other can be detected in one sensing plane. Such an optical sensor can therefore detect not only vertical movements of the lifting frames but also horizontal movement components, for example during a pivoting movement of a lifting framework.

According to a preferred development, at least one visually recognizable marking facing the optical sensor is arranged on the lifting arrangement, with such a marking being designed in particular in the form of an additional component attached to the lifting arrangement or to the second lifting frame, or in the form of a change in color or a change in surface structure.

In this connection, it is advantageous if the marking is attached at a predetermined reference position on the lifting arrangement or on the lifting frame such that a position of the marking, which position is detected by the sensor, can be compared with the absolute reference position. Such a construction makes it possible that, during the measurement of distance or lifting height by optical sensing of a moving surface of the lifting frame, at least one reference position is known, using which a calibration can be undertaken if the measured result greatly differs from the expected result. Such markings can be distributed over the entire vertical length of a lifting frame such that reference positions are provided at a plurality of locations, as a result of which increased safety during operation can be achieved.

The first lifting frame, in particular in the case of a commercially available forklift truck, can be coupled to the vehicle frame in such a manner that the entire lifting framework can be pivoted about a pivot axis which is substantially orthogonal to the straight-ahead direction of travel and lies in a plane substantially parallel to the underlying surface. In this case, an optical sensor can be attached to the industrial truck, in particular to the vehicle frame, in such a manner that the pivoting movement of the lifting framework can be detected. In this connection, it is pointed out that such optical sensors for industrial trucks can also advantageously be used for detecting the movement of other components, such as, for example, mounted implements (rotation), motors, chain pulleys and the like.

The lifting arrangement can comprise a load pickup means and/or a driver's cab, with the load pickup means and/or the driver's cab being attached in particular to a lifting frame and/or to the second lifting frame. In this case, it is particularly advantageous if an optical sensor is attached to the load pickup means and/or to the driver's cab, said sensor being directed toward a surface of one of the second lifting frames such that the vertical movement of the load pickup means and/or of the driver's cab relative to said second lifting frame can be detected. In this case, the optical sensor is therefore attached to the movable component of the lifting framework and senses the surface of a second lifting frame which is fixed during the lifting of the driver's cab. It is apparent from this that the optical sensor of the measuring arrangement according to the invention can be attached not only to positionally fixed components of the industrial truck, but also to moving components, which leads to great flexibility in the designing of the entire measuring arrangement for an industrial truck. A load pickup means can also be understood as meaning merely a fork carrier on which load pickup forks or other mounted implements can be fitted.

The optical sensor is attached to the load pickup means or to the driver's cab advantageously at a location which cannot be reached by means of loads or an operator during normal operation such that the alignment of the optical sensor cannot be disturbed by external influences, for example by damage or the like. According to a preferred embodiment, in the case of the driver's cab, the optical sensor is arranged below the floor of the driver's cab such that the operator does not see the sensor and therefore also cannot knock against the sensor with his feet.

In certain embodiments of industrial trucks, in the event of a driver's cab being attached to the second lifting frame, a further lifting apparatus for a load pickup means attached to the driver's cab may be provided, with it being possible, in such a case, for a further optical sensor to be provided by means of which the relative movement between said load pickup means and the driver's cab can be detected.

Of course, a measuring arrangement with at least one optical sensor can also be supplemented by other measuring devices which, in combination, permit optimum lifting height measurement within the bounds of the required safety aspects. In particular, it may also be desirable to keep at least one mechanical lifting height measuring system as a security system in order, should an optical sensor fail, nevertheless to be able to provide the required measuring results for the lifting height from a different source.

Since the optical measurement takes place contactlessly, it is also conceivable for existing industrial trucks to be retrofitted with optical sensors.

Furthermore, a method for determining the lifting height in a lifting framework of an industrial truck having at least one of the previously described features is also proposed according to the invention, with the distance covered by the first lifting frame and/or the lifting arrangement being detected by sensing of a surface of the first lifting frame or of the lifting arrangement by means of an associated optical sensor.

According to a particularly preferred development, in said method, during a pivoting movement of the first lifting frame or during the lifting movement of the lifting arrangement, a marking on the first lifting frame or on the lifting arrangement is detected, the position of the marking, which position is detected by incremental measurement of the distance, is compared with a stored, absolute position reference value of said marking, and if a predetermined difference between the position measured value and position reference value for the marking is exceeded, with reference to the absolute position reference value, a corresponding signal is provided.

Such a method, in which the markings during the measuring operation represent events which should be expected, permits regular and reliable monitoring and, if appropriate, recalibration of the measuring system during operation. Furthermore, such a method also permits rapid indication of deviations in the measured results in comparison to the expected results such that malfunctions can be rapidly detected. As a rule, the sensor and the vehicle controller have a level of expectancy with regard to the recognition of such markings. Should no marking be recognized at the expected point or should a marking be recognized at a unexpected point, the vehicle can be brought into a safe operating state, for example on the basis of the issued signal. Furthermore, an absolute determination of position can also take place by means of certain marking patterns when traversing two consecutive markings. For example, a plurality of markings having different distances in each case between two adjacent markings (for example 10, 20, 30, 40 or 15, 25, 35 cm or the like) can be arranged as marking patterns.

The invention is described below using a non-limiting exemplary embodiment and with reference to the attached figures.

FIGS. 6*a* and 6*b* show a perspective illustration of a cover having a protruding stop and its interaction with the locking mechanism in its open and locking positions, respectively.

Figure 1:
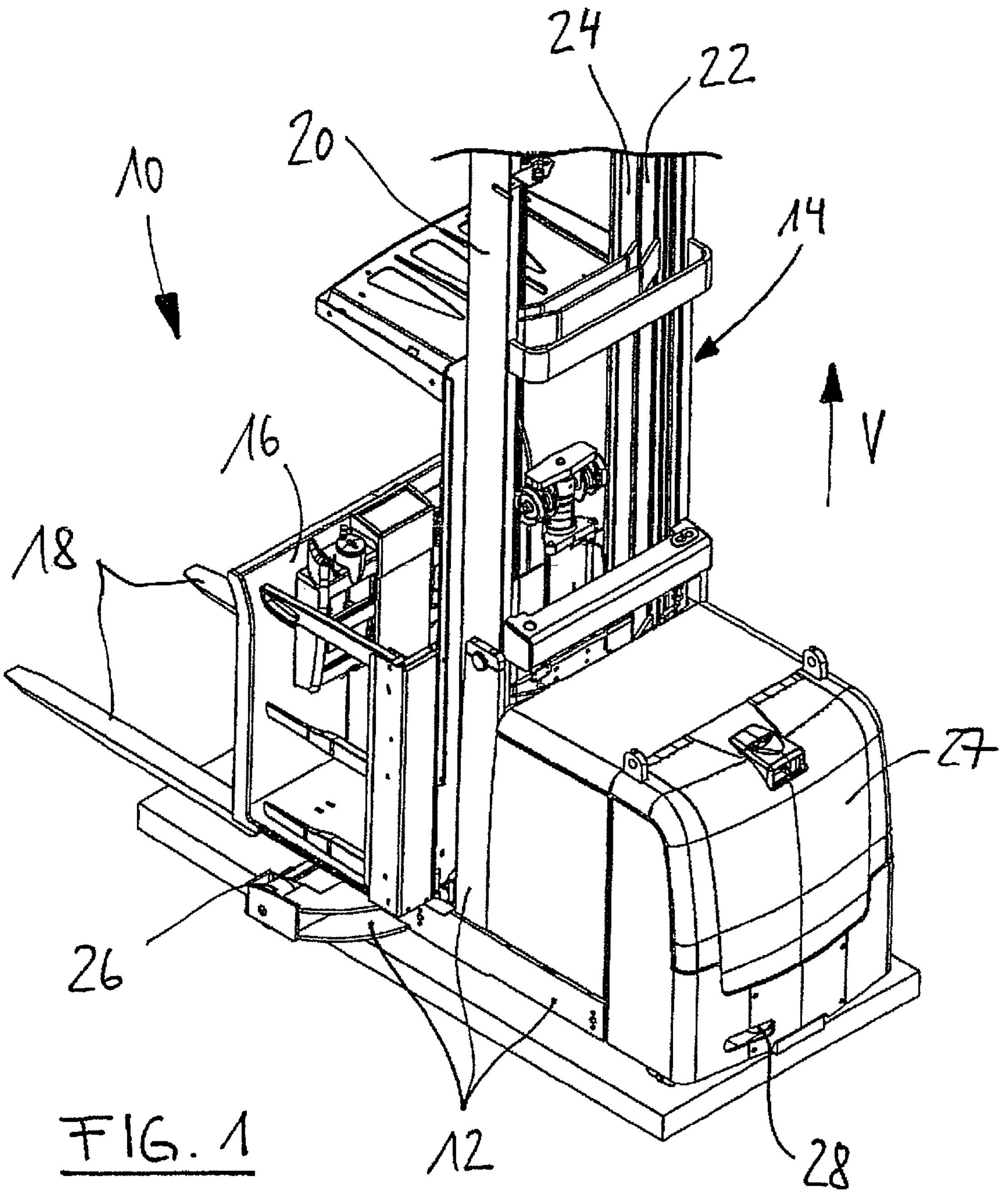
FIG. 1 illustrates a schematic perspective view of an industrial truck in the form of a commissioner.

The industrial truck 10 which is illustrated schematically and perspectively in FIG. 1 has the main components known for a commissioner 10 of this type—a vehicle frame or chassis 12, a lifting framework 14, a driver's cab 16 and load pickup means 18. The lifting framework 14 has a first lifting frame 20 which is fastened to the vehicle frame 12 and on which two further lifting frames, namely a second lifting frame 22 and a third lifting frame 24, are guided and can be extended in the vertical direction. The driver's cab 16 is fitted displaceably in the vertical direction V along the third lifting frame 24.

For the sake of completeness, it is pointed out that the commissioner 10 illustrated here has two front wheels 26 and a driven and steerable rear wheel 28, only part of which is visible below a vehicle covering 27.

Figure 3:
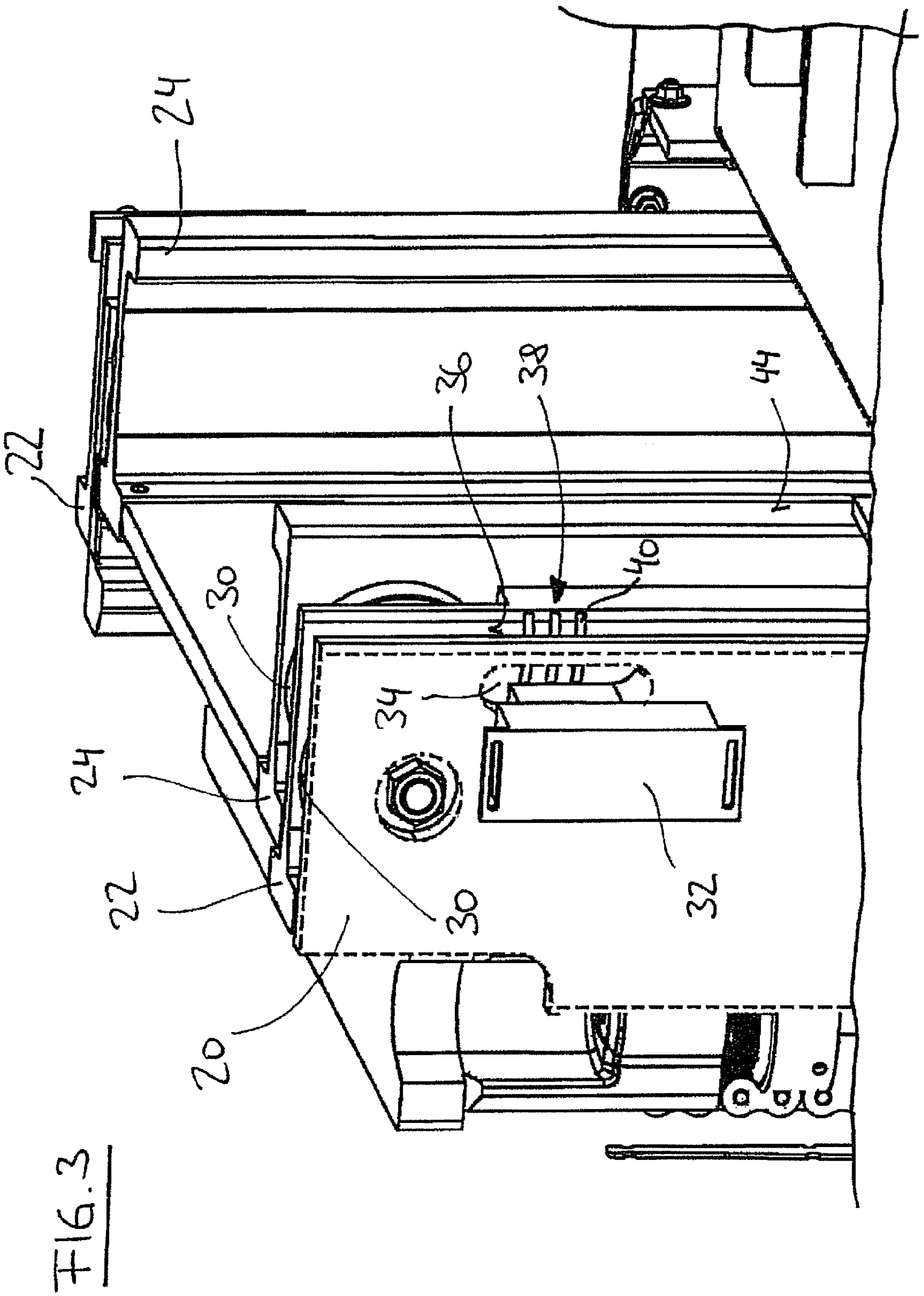
FIG. 3 is a perspective partial illustration from a somewhat different viewing angle than in FIG. 2.
Figure 4:
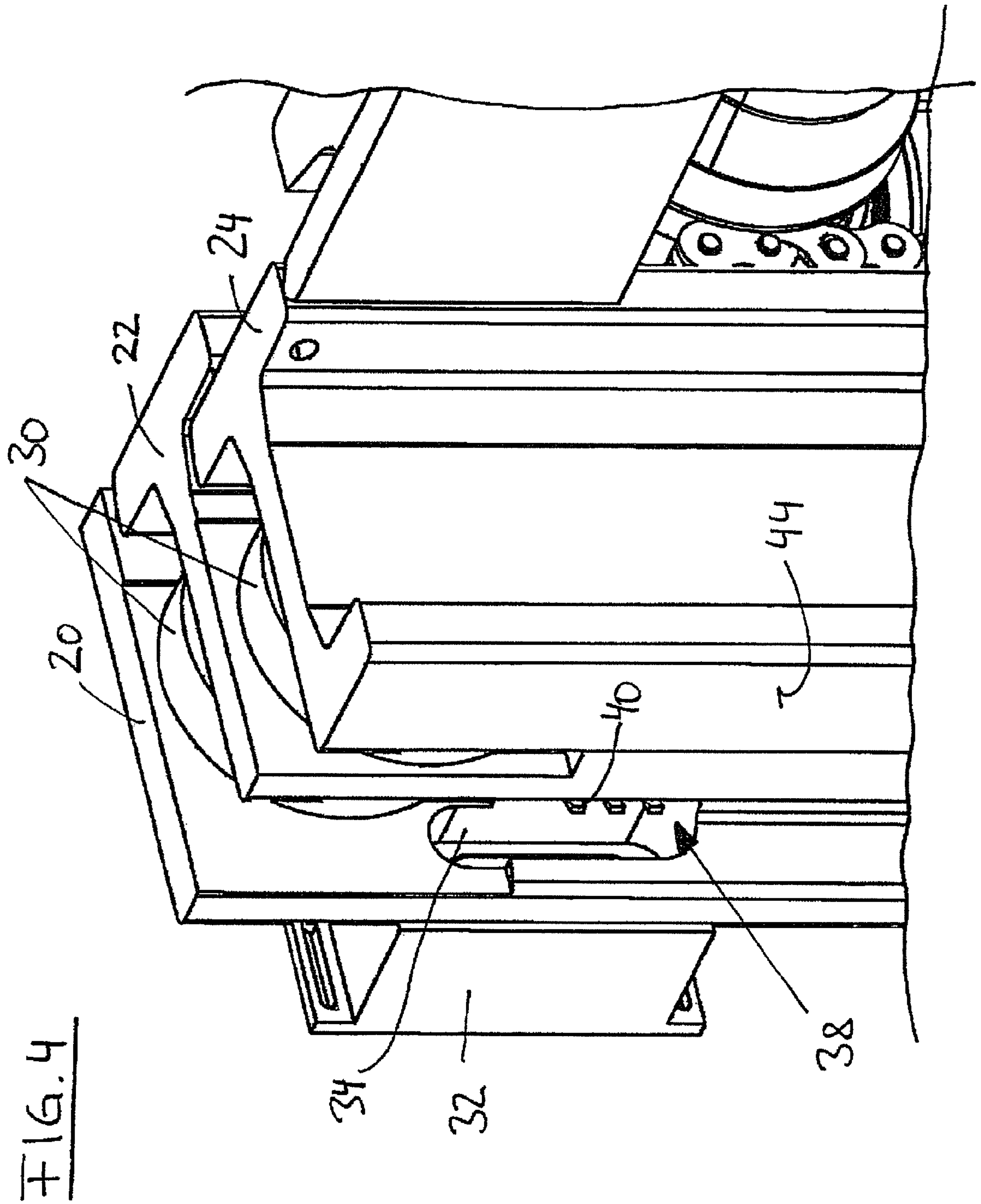
FIG. 4 is a further perspective partial illustration of the lifting framework.

A measuring arrangement for determining the lifting height of the lifting frames 22, 24 with respect to the first lifting frame 20 is presented below in FIGS. 2 to 4 with reference to various perspective partial illustrations of that side of the lifting framework 14 which is on the right with respect to a forward direction of travel.

Figure 2:
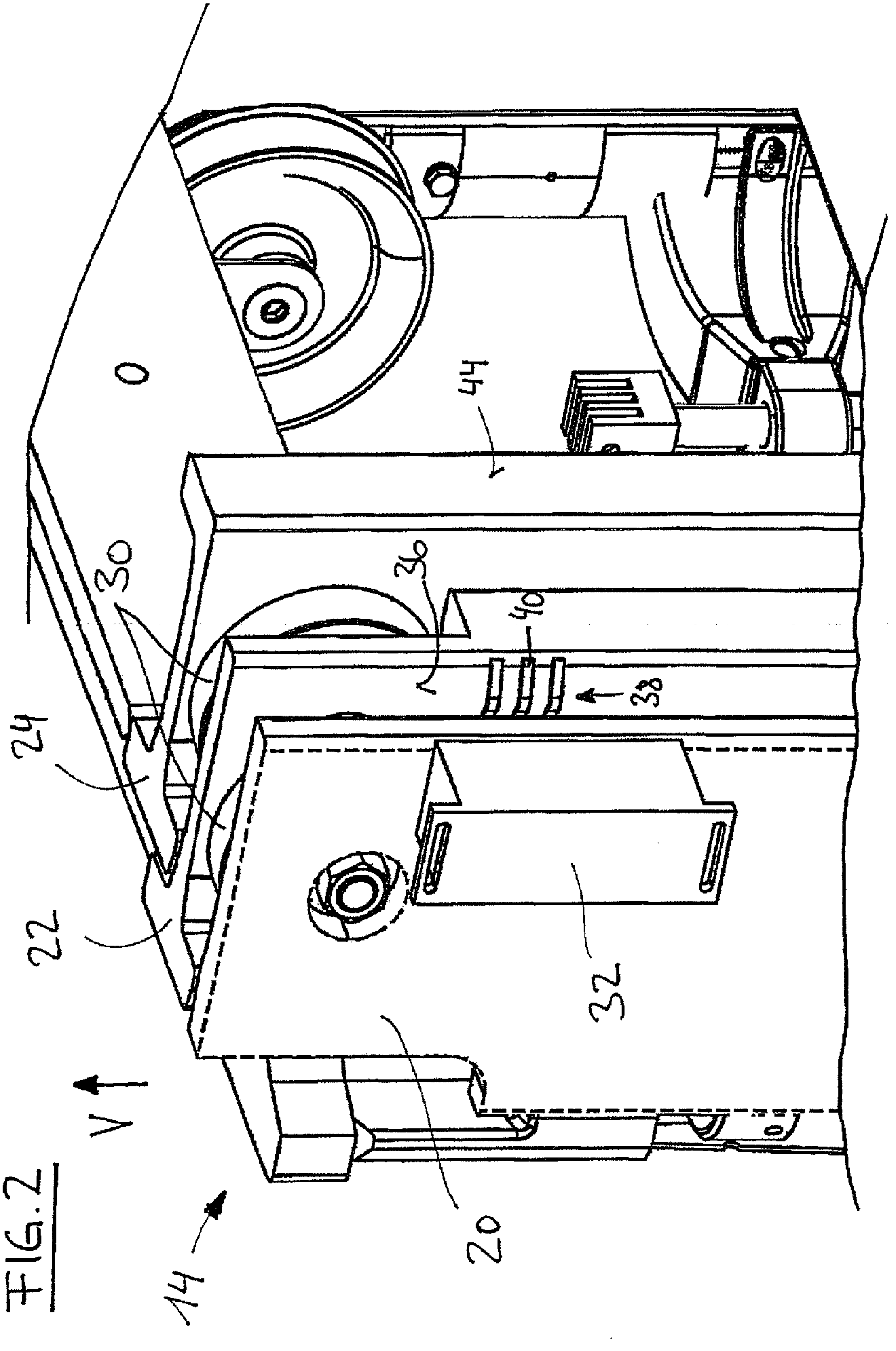
FIG. 2 is an enlarged, perspective partial illustration of the lifting framework with an embodiment of the measuring arrangement according to the invention.

The lifting framework 14 with the first lifting frame 20 and the second and third lifting frames 22, 24 can be seen in FIG. 2. The lifting frames 22, 24 are movable in the vertical direction V with respect to the first lifting frame 20 and are supported, inter alia, on respective rollers 30 of the adjacent lifting frame.

An optical sensor 32 of a contactless measuring arrangement for the lifting height is attached to the first lifting frame 20 by means of a connecting arrangement which is not illustrated specifically, for example a flange-mounted bracket or the like. The lens of the sensor 32 is directed through an opening 34 formed in the first lifting frame 20 (FIG. 3) toward a lateral surface 36 of the second lifting frame 22 such that the movement of the second lifting frame 22 relative to the fixed, first lifting frame 20 can be sensed and detected by the sensor 32. When the movement is detected, the optical sensor is oriented with the coincidental surface design of the lifting frame 22. In the example illustrated, a marking 38 which here comprises three sheet-metal strips 40 rising from the surface 36 is located on the surface 36 of the second lifting frame 22. As already described in the introduction, the marking 38 is arranged at a predetermined position on the lifting frame 22 such that, during a vertical movement of the lifting frame 22, a position of the marking 38, which position is detected by the sensor 32, i.e. is measured, can be compared with the stored reference position of the marking 38 by means of a control system (not illustrated) in order to determine a difference between the measured and stored positions and in order, if appropriate, to issue an error message or to undertake a calibration of the measuring system if the difference between the measurement and reference value exceeds a desired value. In this case, the marking 38 does not serve to detect the movement, but rather merely permits a position adjustment (recalibration) between the measured and stored positions.

The form of the marking illustrated here with three strips 40 protruding from the substantially planar surface 36 of the second lifting frame 22 toward the sensor forms a visually readily apparent marking leading to strong signal changes at the optical sensor such that the marking 38 can be recognized surely and reliably during the lifting height determination. Although only one marking 38 which is attached to the lifting frame 22 can be seen in the drawings, it is, however, entirely possible for a plurality of markings which are arranged at a distance from one another in the vertical direction to be arranged along the entire length of the second lifting frame 22 such that, during the lifting movement of the lifting frame 22, a check can be repeatedly made between the measuring result and a reference position of a marking 38. It is pointed out that the marking can also have a different design. Notches, color strips or the like which are embedded in the surface 36 are also conceivable, said markings not constituting position indicators for detecting the movement of the lifting frame and being arranged at relatively large distances from one another such that the optical sensor senses the coincidental surface design of the lifting frame between two markings, with the signals determined therefrom serving as basic information for the movement of the lifting frame.

In the present example, the second lifting frame 22 and the third lifting frame 24 always move simultaneously with a certain transmission ratio, for example the lifting frame 22 moves by 10 cm relative to the first lifting frame 20, with the third lifting frame 24 moving likewise by 10 cm in the vertical direction V relative to the second lifting frame 22. Owing to this known transmission ratio, it is therefore not required for the movement of the third lifting frame 24 to be detected by a further optical sensor, but rather the lifting height can be calculated, in particular totted up, by determining the distance covered by the second lifting frame 22 taking into consideration the simultaneously executed lifting movement of the third lifting frame 24. However, it should not be ruled out at this juncture that there are embodiments in which such a coupling of the movements between the second lifting frame 22 and third lifting frame 24 does not exist and it is desirable that the movement of the third lifting frame 24 relative to the second lifting frame 22 can likewise be detected.

Figure 5:
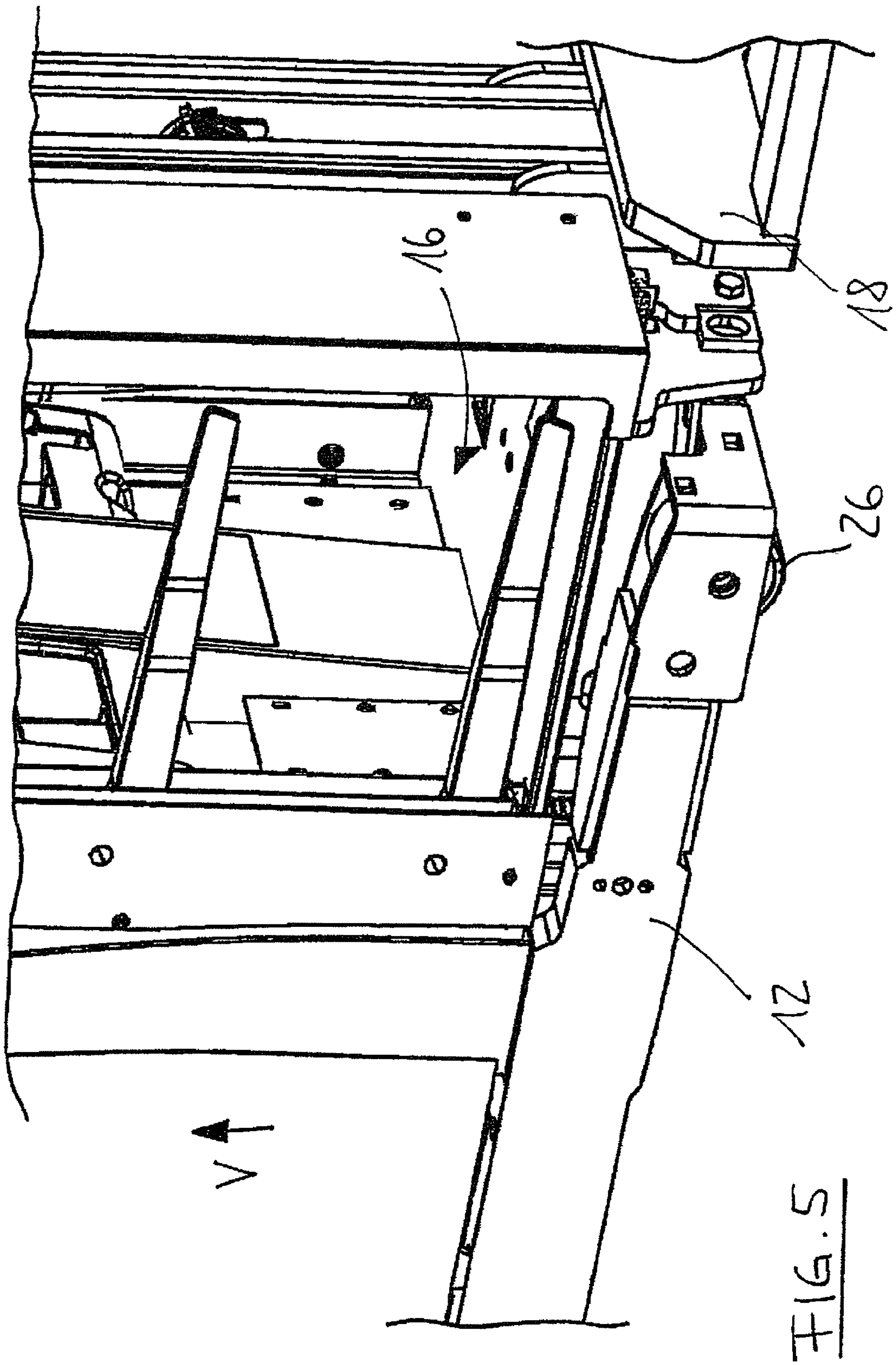
FIG. 5 is a perspective partial illustration of the lower part of a driver's cab and of a vehicle frame.

FIG. 5 shows, in an enlarged, perspective partial illustration, the front, right region of the vehicle frame 12 together with the front wheel 26 and driver's cab 16 located thereabove. The driver's cab 16 is guided on the third lifting frame 24 and is mounted displaceably in the vertical direction V relative thereto. In order to be able to determine the lifting height of the driver's cab 16 relative to the third lifting frame 24, a further sensor 32' is arranged on the lower side of the bottom 42 of the driver's cab 16 (FIG. 6), the lens of said sensor being directed toward a front surface 44 of the third lifting frame 24. In this arrangement, the sensor 32' is arranged in an intermediate space 46 between the lower side of the bottom 42 and an upper side of a protective plate 48 such that the sensor cannot be damaged during operation either by an operator or by loads or the like. A further marking 38' is attached on the front side 44 of the third lifting frame 24, said marking fulfilling the same purpose as the marking 38 on the second lifting frame 22. Reference is made in this regard to the explanations with respect to FIGS. 2 to 4.

Figure 6:
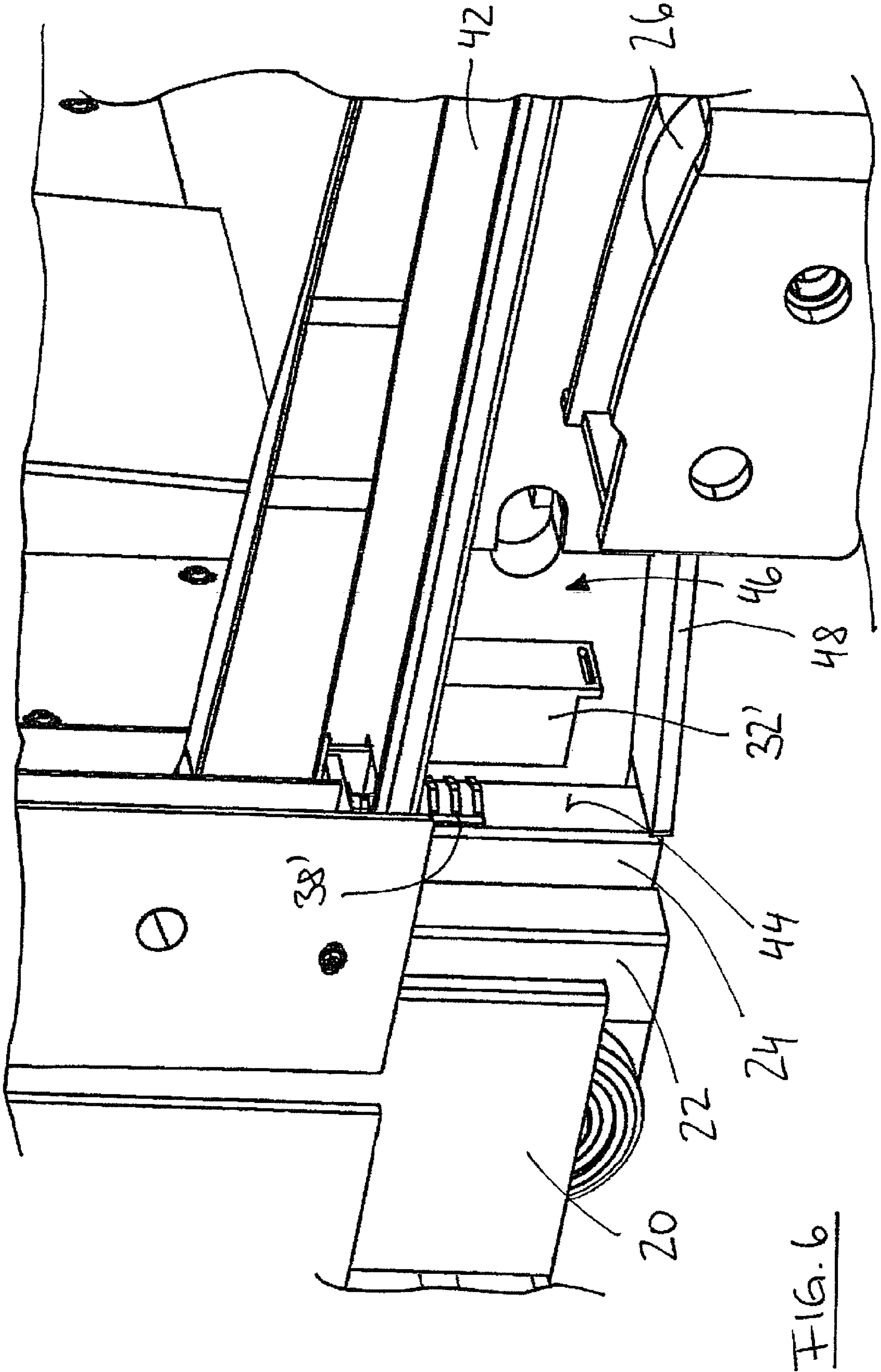
FIG. 6 is an enlarged, perspective partial illustration of FIG. 5, with parts of the vehicle frame not being illustrated so that the measuring arrangement for the driver's cab is visible.

As is apparent from FIG. 6, the optical sensor 32' is arranged on the moving part, namely the driver's cab 16, and senses the movement relative to the fixed third lifting frame 24. In a measuring arrangement according to the invention, it therefore does not matter whether the sensor is attached to a fixed or a movable part of the industrial truck in order to be able to execute the optical, contactless distance measurement. As already explained above with respect to the lifting frame 22, further markings 38' can be provided on the lifting frame 24 in order to more precisely and reliably determine the lifting height of the driver's cab 16 relative to the third lifting frame 24.

It is furthermore apparent from FIG. 5 that the load pickup means 18 is arranged movably in the vertical direction V on the driver's cab 16. Said vertical movement can likewise be detected by an optical sensor if this is desired.

For example, the lifting height of the driver's cab 16 and of the load pickup means 18 relative to the vehicle frame 12 and the underlying surface, respectively, can be determined as follows.

If the driver's cab 16 and the load pickup means 18 are moved upward in the vertical direction from a lowermost starting position, first of all only a vertical movement of the driver's cab 16 relative to the third lifting frame 24 takes place until the lifting distance of the driver's cab 16 has been exhausted. The lifting height of the driver's cab 16 can therefore be determined solely by detecting the distance covered by the optical sensor 32' relative to the third lifting frame 24. If raising has to be continued, the second lifting frame 22 and the third lifting frame 24 move vertically relative to the fixed first lifting frame 20, with the two lifting frames 22, 24 being coupled to each other in terms of their movement, if appropriate in a stepped-up manner, as described above. Since the driver's cab 16 is guided on the third lifting frame 24, the lifting height of the driver's cab therefore emerges from totting up the measured distance covered by the optical sensor 32' along the third lifting frame 24, from measuring the distance covered by the sensor 32 of the second lifting frame 22 relative to the first lifting frame 20 and measuring the distance additionally covered by the third lifting frame on account of being coupled in movement to the second lifting frame 22.

Since the load pickup means 18 can be displaced in the vertical direction relative to the driver's cab 16 independently of the lifting frames 22, 24, said vertical movement can also be detected, if required, by a further optical sensor.

Of course, the sensors 32, 32' can also be provided at different locations if this is expedient and can supply reliable measuring results. As already mentioned, it is entirely conceivable to combine optical sensors 32, 32' with at least one further, non-optical system in order, should an optical sensor fail, optionally to be able to carry out a lifting height measurement in a different manner.

Figure 7:
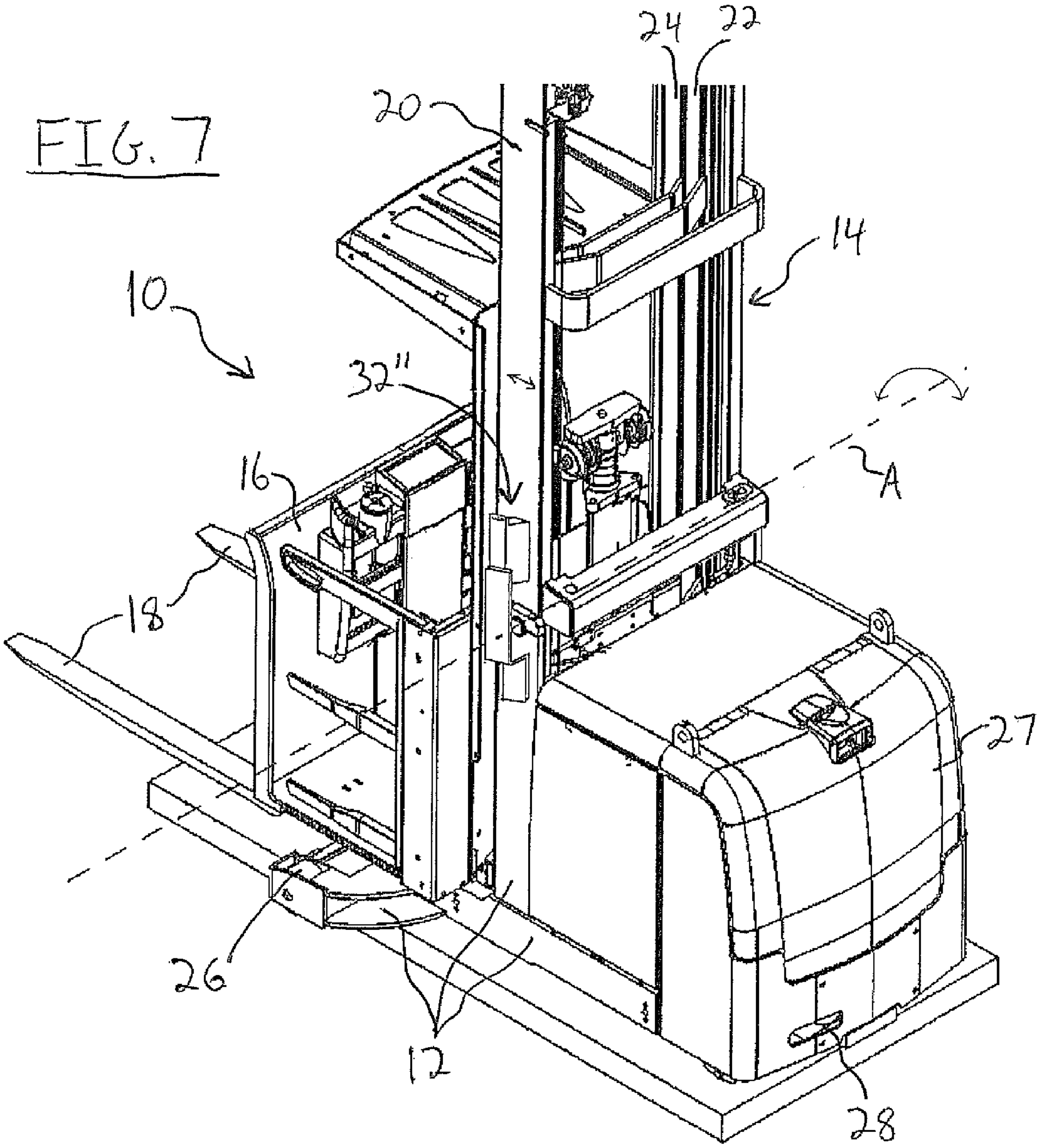
FIG. 7 illustrates a schematic perspective view of an industrial truck

In some embodiments, as illustrated schematically and perspectively in FIG. 7, the industrial truck 10 has the first lifting frame 20 coupled to a vehicle frame 12 in such a manner that an entire lifting framework 14 is capable of being pivoted about a pivot axis A which is substantially orthogonal to a straight-ahead direction of travel and lies in a plane substantially parallel to an underlying surface. An optical sensor 32" may be attached to the industrial truck 10 (e.g., to the vehicle frame 12 of the industrial truck 10) in such a manner that the pivoting movement of the lifting framework 14 is capable of being detected. In this connection, it is pointed out that such optical sensors for industrial trucks can also advantageously be used for detecting the movement of other components, such as, for example, mounted implements (rotation), motors, chain pulleys and the like.

Figure 8:
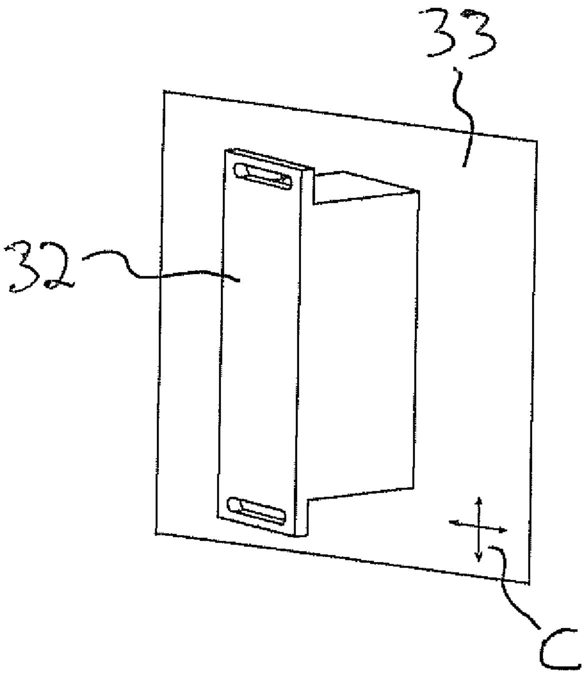
FIG. 8 illustrates a schematic perspective view of an optical sensor designed in such a manner that two movement components which are orthogonal with respect to each other are capable of being detected in one sensing plane.

In some embodiments, as illustrated schematically and perspectively in FIG. 8, the optical sensor 32, which may be any of optical sensors 32, 32' or 32", may be designed in such a manner that two movement components, which are orthogonal with respect to each other, are capable of being detected in one sensing plane 33. For example, in the embodiment shown in FIG. 8, a cross of arrows C indicates that the optical sensor 32 is designed in such a manner that two movement components which are orthogonal with respect to each other are capable of being detecting in the sensing plane 33. Such an optical sensor 32 can therefore detect not only vertical movements of the lifting frames but also horizontal movement components, for example during a pivoting movement of a lifting framework.

The invention claimed is:

1. An industrial truck, comprising:
a vehicle frame;
a first lifting frame that is attached to the vehicle frame;
a second lifting frame that is movable in the vertical direction relative to the first lifting frame, the second lifting frame being guided on the first lifting frame;
a third lifting frame that is moveable in the vertical direction relative to the first lifting frame, the third lifting frame being guided on the second lifting frame, wherein movement of third lifting frame is coupled to movement of the second lifting frame such that the second lifting frame and the third lifting frame move simultaneously with a transmission ratio;
a driver's cab that is moveable in the vertical direction relative to the third lifting frame, the driver's cab being guided on the third lifting frame; and
a measuring arrangement comprising:
a first optical sensor that is fastened to the first lifting frame, directed toward a surface of the second lifting frame, and configured to contactlessly detect movement of the second lifting frame relative to the first lifting frame by sensing a coincidental surface design of the surface of the second lifting frame; and
a second optical sensor that is arranged on the driver's cab, directed toward a surface of the third lifting frame, and configured to contactlessly detect movement of the driver's cab relative to the third lifting frame by sensing a coincidental surface design of the surface of the third lifting frame;
wherein the measuring arrangement is configured to determine the lifting height of the driver's cab by adding up the movement of the second lifting frame relative to the first lifting frame detected by the first optical sensor, the movement of the driver's cab relative to the third lifting frame detected by the second optical sensor, and the movement of the third lifting frame relative to the first lifting frame on account of the movement of the third lifting frame being coupled to the movement of the second lifting frame.

2. The industrial truck as claimed in claim 1, wherein the second lifting frame is capable of being displaced telescopically in the vertical direction with respect to the first lifting frame.

3. The industrial truck as claimed in claim 2, wherein the second and third lifting frames are guided telescopically on one another in the vertical direction, and the coupling between the second and third lifting frames is a stepped-up or stepped-down vertical movement coupling.

4. The industrial truck as claimed in claim 1, wherein the first or second optical sensor is designed in such a manner that two movement components which are orthogonal with respect to each other are capable of being detected in one sensing plane.

5. The industrial truck as claimed in claim 1, wherein at least one visually recognizable marking facing the first optical sensor is arranged on the surface of the second lifting frame.

6. The industrial truck as claimed in claim 5, wherein the marking is designed in the form of an additional component attached to the second lifting frame, or in the form of a change in color or a change in surface structure on the second lifting frame.

7. The industrial truck as claimed in claim 5, wherein the marking is provided at a predetermined reference position on the second lifting frame such that a position of the marking, which position is detected by the first optical sensor, is capable of being compared with an absolute reference position.

8. The industrial truck as claimed in claim 1, wherein the first lifting frame is coupled to the vehicle frame in such a manner that a lifting framework comprising the first, second, and third lifting frames is capable of being pivoted about a pivot axis which is substantially orthogonal to a straight-ahead direction of travel and lies in a plane substantially parallel to an underlying surface.

9. The industrial truck as claimed in claim 8, wherein the first or second optical sensor or a further optical sensor is attached to the industrial truck in such a manner that the pivoting movement of the lifting framework is capable of being detected.

10. The industrial truck as claimed in claim 9, wherein the further optical sensor is attached to the vehicle frame.

11. The industrial truck as claimed in claim 1, further comprising a load pickup means, with the load pickup means being attached to the first lifting frame or to the second lifting frame.

12. The industrial truck as claimed in claim 11, wherein the driver's cab is attached to the second lifting frame, and the industrial truck comprises:

a lifting apparatus for the load pickup means attached to the driver's cab; and a further optical sensor by means of which the relative movement between said load pickup means and the driver's cab is capable of being detected.

13. The industrial truck as claimed in claim 1, wherein the measuring arrangement does not comprise a sliding block that slides on a surface during the movement of the second lifting frame relative to the first lifting frame.

14. The industrial truck as claimed in claim 1, wherein the measuring arrangement is free from mechanically stressed components.

15. An industrial truck, comprising:

a vehicle frame;

a first lifting frame that is attached to the vehicle frame;

a second lifting frame that is movable in the vertical direction relative to the first lifting frame, wherein the second lifting frame is capable of being displaced telescopically in the vertical direction with respect to the first lifting frame and is guided on the first lifting frame; and a third lifting frame that is moveable in the vertical direction relative to the first lifting frame, wherein the third lifting frame is guided on the second lifting frame, wherein movement of third lifting frame is coupled to movement of the second lifting frame such that the second lifting frame and the third lifting frame move simultaneously with a transmission ratio;

a driver's cab that is moveable in the vertical direction relative to the third lifting frame, the driver's cab being guided on the third lifting frame; and a measuring arrangement comprising:

a first optical sensor that is fastened to one of the first lifting frame and the second lifting frame, directed toward a surface of the other of the first lifting frame and the second lifting frame, and configured to contactlessly detect relative movement of the first lifting frame and the second lifting frame; and a second optical sensor that is arranged on one of the driver's cab and the third lifting frame, directed toward a surface of the other of the driver's cab and third lifting frame, and configured to contactlessly detect relative movement of the driver's cab and the third lifting frame;

wherein the measuring arrangement is configured to determine the lifting height of the driver's cab by adding up the relative movement of the first lifting frame and the second lifting frame detected by the first optical sensor, the relative movement of the driver's cab and the third lifting frame detected by the second optical sensor, and the relative movement of the first lifting frame and third lifting frame on account of the movement of the third lifting frame being coupled to the movement of the second lifting frame.

16. The industrial truck as claimed in claim 15, wherein the second and third lifting frames are guided telescopically on one another in the vertical direction, and the coupling between the second and third lifting frames is a stepped up or stepped down vertical movement coupling.

17. The industrial truck as claimed in claim 15, wherein the measuring arrangement does not comprise a sliding block that slides on a surface during the movement of the second lifting frame relative to the first lifting frame.

18. The industrial truck as claimed in claim 15, wherein the measuring arrangement is free from mechanically stressed components.

19. A method for determining the lifting height of a driver's cab in an industrial truck, the method comprising:

contactlessly detecting, by a first optical sensor fastened to one of a first lifting frame and a second lifting frame and directed to the other of the first lifting frame and second lifting frame, a relative movement of the first lifting frame and the second lifting frame, wherein the first lifting frame is attached to a vehicle frame, the second lifting frame is movable in the vertical direction relative to the first lifting frame, and the second lifting frame is guided on the first lifting frame;

contactlessly detecting, by a second optical sensor arranged on one of the driver's cab and a third lifting frame and directed to the other of the driver's cab and the third lifting frame, relative movement of the driver's cab and the third lifting frame, wherein the third lifting frame is moveable in the vertical direction relative to the first lifting frame, the third lifting frame is guided on the second lifting frame, movement of third lifting frame is coupled to movement of the second lifting frame such that the second lifting frame and the third lifting frame move simultaneously with a transmission ratio, the driver's cab is moveable in the vertical direction relative to the third lifting frame, and the driver's cab is guided on the third lifting frame; and determining, by a measuring arrangement comprising the first and second optical sensors, the lifting height of the driver's cab by adding up the relative movement of the first lifting frame and the second lifting frame detected by the first optical sensor, the relative movement of the driver's cab and the third lifting frame detected by the second optical sensor, and the relative movement of the first lifting frame and third lifting frame on account of the movement of the third lifting frame being coupled to the movement of the second lifting frame.

20. The method as claimed in claim 19, further comprising, during a pivoting movement of the first lifting frame:

detecting a marking on the first lifting frame or the second lifting frame;

comparing the position of the marking, which position is detected by incremental measurement of the distance, with a stored, absolute position reference value of said marking; and providing a corresponding signal if a predetermined difference between a position measured value and position reference value for the marking is exceeded.

* * * * *